United States Patent [19]

Frisch et al.

[11] 4,245,080

[45] Jan. 13, 1981

[54] POLYURETHANE-BASED LACQUER BINDERS PREPARED FROM TRIS-(β-HYDROXYPROPYL-ISOCYANURATE

[75] Inventors: Kurt C. Frisch, Detroit, Mich.; Daniel M. J. Tummers; Anne Te Nijenhuis, both of Geleen, Netherlands

[73] Assignee: Stamicarbon, B.V., Geleen, Netherlands

[21] Appl. No.: 17,281

[22] Filed: Mar. 5, 1979

[30] Foreign Application Priority Data

Mar. 4, 1978 [NL] Netherlands ................. 7802414

[51] Int. Cl.$^3$ .............................................. C08G 18/32
[52] U.S. Cl. ........................................ 528/60; 528/73
[58] Field of Search ..................... 528/60, 73

[56] References Cited

U.S. PATENT DOCUMENTS

| 3,174,950 | 3/1965 | Cordier | 528/73 |
| 4,063,020 | 12/1977 | den Otter | 528/73 |

*Primary Examiner*—Maurice J. Welsh
*Attorney, Agent, or Firm*—Cushman, Darby & Cushman

[57] ABSTRACT

Single-component or two part polyurethane-based lacquers are prepared on the basis of a polymeric polyhydroxy compound having a high molecular weight in the range of 300 to 5000, such as poly(oxytetramethylene)-glycol, a low molecular weight diol such as ethylene glycol, at least one isocyanate such as toluene diisocyanate and tris-(β-hydroxypropyl)-isocyanurate or its ethoxylated derivative together with the customary accelerators, additives, solvents and the like used in lacquer manufacture. These lacquers exhibit exceptional hardness, high impact resistance, good adhesion to the substrate to which they are applied as well as corrosion resistance.

13 Claims, No Drawings

POLYURETHANE-BASED LACQUER BINDERS PREPARED FROM TRIS-($\beta$-HYDROXYPROPYL-ISOCYANURATE The present invention relates to polyurethane-based lacquer binders and their preparation.

Binders have been prepared from one or more dihydroxy or polyhydroxy compounds, a polyisocyanate and a trihydroxy compound used as cross-linking agent. It is possible to react the hydroxyl compounds and the diisocyanate to form a prepolymer containing isocyanate groups, and this prepolymer hardens in air while reacting with atmospheric water. It is also possible to convert one or more of the hydroxyl compounds into a prepolymer containing isocyanate groups and to add to this, in a second step, one or more hydroxyl compounds and then hardening the mixture by stoving at elevated temperature. It is important to select reactants that in combination with the binder will form a coating exhibiting a good combination of hardness and elasticity.

According to the present invention, a binder is prepared on the basis of a polyisocyanate, one or more dihydroxy or polyhydroxy compounds and at least one trihydroxy compound, using, in combination:

A-1.—a polymeric polyhydroxy compound or polyol having a molecular weight of between about 300 and about 5000;

A-2.—an aliphatic or cycloaliphatic dihydroxy compound having a molecular weight of between about 60 and about 200, in an amount such that for every hydroxyl group obtained from the polymeric polyol component (A-1), there are between 0 and 20 hydroxyl groups available from the low-molecular-weight diol component (A-2);

B.—as the isocyanate component tris-($\beta$-hydroxypropyl)-isocyanurate or ethoxylated tris-($\beta$-hydroxypropyl)-isocyanurate in an amount such that for every hydroxyl group available from the isocyanurate component there are between 0.25 and 2.5 hydroxyl groups derived polyol and diol from the compounds A-1 and A-2;

C.—at least one polyisocyanate in an amount such that there are between 0.99 and 1.10 isocyanate groups for every hydroxyl group;

D.—an additional compound or compounds such as catalysts for accelerating the reaction of the isocyanate groups, and, optionally, other additives and solvents customarily used in lacquer formulations.

We have found that the process according to the present invention produces binders for single-component or two-component lacquers for forming coats exhibiting high hardness combined with high impact resistance good adhesion to the substrate, good corrosion resistance and favorable high-temperature characteristics.

Tris-($\beta$-hydroxypropyl)-isocyanurate is known and can be prepared by reacting cyanuric acid with propylene oxide. By using this compound as the trihydroxy compound coatings can be obtained which show higher hardness, better flexibility and adhesion than coatings prepared on the basis of analogous formulations which incorporate a trihydroxy compound not containing an isocyanurate ring. Comparable results are obtained if ethoxylated tris-($\beta$-hydroxypropyl)isocyanurate is used. This compound can be obtained by reacting one mole of tris-($\beta$-hyroxypropyl)-isocyanurate with from one to about three, and referably three, moles of ethylene oxide. The ethoxylated derivative is somewhat more reactive than the parent compound, due to the presence of primary hydroxy groups. In formulations based on the ethoxylated compound, the low-molecular weight diol may often be omitted if desired.

A part of the necessary hydroxyl groups is provided by the polymeric polyhydroxy compound A-1. Compounds with a molecular weight of between 300 and 5000 and containing 2-5 hydroxyl groups per molecule may be used. Preferably the compounds contain 2 to 3 and especially about 2 hydroxyl groups. Suitable polymeric polyols include the polyoxy-alkylene glycols composed of $C_2$ to $C_4$ oxyalkylene units, such as polyethylene glycol, polypropylene glycol, random or block copolymers of ethylene oxide and propylene oxide, adducts of ethylene oxide or propylene oxide to a trihydroxy compound, polylactone diols derived from a lactone containing 5 to 12 carbon atoms, for instance hydroxyl-terminated polycaprolactone or polyvalerolactone or co-polylactones, hydroxyl-terminated polyesters, butadiene polymers containing hydroxyl groups or copolymers of butadiene with, for example, acrylonitrile, isoprene and/or styrene containing hydroxyl groups, and hydroxyl group containing acrylates.

The polyesters are usually obtained by reacting one or more $C_4$ to $C_{10}$ aliphatic and/or aromatic carboxylic acids, for instance adipic acid, azelaic acid, phthalic acid or terephthalic acid, and one or more aliphatic and/or cycloaliphatic diols, for instance ethylene glycol, diethylene glycol, 1,4-butane diol, 1,6-hexane diol, propylene glycol or 1,4-(hydroxymethyl)-cyclohexane. The butadiene (co)polymers containing hydroxyl groups generally contain more than 2, and typically between 2.0 and 2.3, hydroxyl groups. Preferably a polymeric polyol is used having a moleculr weight of between 500 and 2000. Particularly preferred are the polyalkylene glycols, the hydroxyl-terminated polylactones, the hydroxyl-terminated polyesters and the hydroxyl group containing polyacrylates.

As the low-molecular-weight diol we prefer such a diol that can function as a chain extender in addition to the polymeric polyol. Dihydroxy compounds having a molecular weight of between 60 and 200 can also be used. Some specific examples include the aliphatic unbranched diols, such as ethylene glycol, 1,4-butanediol, and 1,6-hexanediol; branched diols, such as propyleneglycol and 2,2-dimethyl-1,4-butanediol; low-molecular-weight polyalkylene glycols, such as diethyleneglycol, triethyleneglycol; and cycloaliphatic diols, such as 1,4-(hydroxymethyl)-cyclohexane.

Generally the quantity of low-molecular-weight diol is used such that the end product contains from 0 to 20, preferably 0.5 to 5.0, and more particularly 1.0 to 4.0, hydroxyl groups derived from the low-molecular-weight diol for every hydroxyl group derived from the polymeric polyol. We prefer to use aliphatic diols having 2 to 6 carbon atoms.

As a consequence when the quantity of tris-($\beta$-hydroxypropyl)-isocyanurate or its ethoxylated derivative increases in proportion to the quantity of other polyols, the crosslink density will increase, so that the hardness of the resulting coating increases and the flexibility decreases. Typically an amount is used such that for every hydroxyl group deriving from the isocyanurate component, the binder contains between 0.25 and 2.50 hydroxyl groups deriving from other polyols. Preferably a ratio of between 1:0.5 and 1:2.0 is used.

The polyisocyanates employed may be the commonly used compounds for such binders including, for example, toluene diisocyanates or 4,4-diisocyanatodiphenyl methane. However, we prefer to use saturated aliphatic or cycloaliphatic diisocyanates, including hexamethylene diisocyanate, isophorone diisocyanate, and 4,4-diisocyanato-dicyclohexyl methane. Also suitable are polyisocyanates such as those obtained by catalytic trimerisation of a diisocyanate or by reacting three moles of a diisocyanate with one mole of water or a trihydroxy compound.

In order to harden the binder compositions a catalyst which accelerates isocyanate reactions without giving rise to simultaneous trimerization is used. Compounds typically used for this purpose are notably the nitrogenous catalysts, e.g. triethylene diamine, and the tin-containing catalysts, e.g. dibutyl tin dilaurate. Hardening is effected in the case of a single-component lacquer by exposing a reaction product containing free isocyanate groups to the air, and in the case of a two-component lacquer by reacting a prepolymer containing isocyanate groups with a polyol, preferably at elevated temperature, such as between about 75° and 175° C.

Commonly used solvents may also be incorporated in the binder compositions. The concentration of the binder, or the prepolymers and cross-linking agents in the lacquer may vary between 40 and 90% by weight depending on the viscosity and or concentration desired. If so desired, the binder may be applied in powder form. In that case the isocyanate groups in the prepolymer may be blocked by means of, e.g., phenol, a cresol, caprolactam, or methylethylketone oxime and a levelling agent is added.

If one wishes to prepare a binder for a single-component lacquer, the polyisocyanate is reacted with the polymeric polyol and tris-(β-hydroxypropyl)-cyanurate or its ethoxylated derivative, and, optionally, the low-molecular-weight diol in one or more steps to form a prepolymer containing free isocyanate groups. Auxiliary formulating agents customarily used in lacquers, and a catalyst are added as may be required.

In order to produce a binder for a two-component lacquer, a prepolymer containing isocyanate groups may be prepared, as described above. This is then combined with a lacquer to which just prior to use a solution of the isocyanurate triol and catalyst is added. Preferably, however, the prepolymer is prepared from the polyisocyanate, the polymeric polyol and part of the isocyanurate triol, with NCO to OH ratio of at least 2:1.

The ratio between the hydroxyl groups derived from the isocyanurate triol and from the other polyols may here vary between 1:0.1 and 1:1.5 and preferably between 1:0.5 and 1:1.0. Optionally the free isocyanate groups of the prepolymer may be blocked as indicated above. The lacquer as ready for use then consists of a component containing the prepolymer, and a second component which contains the balance of the isocyanurate triol, the low-molecular-weight diol, and the catalyst.

Another manner in which to prepare a two-component lacquer is by dissolving in one component the polymeric polyol, optionally low-molecular-weight diol, and catalyst, and dissolving in the second component the reaction product obtained by reacting isocyanurate triol with the polyisocyanate, at an NCO to OH ratio of 2:1 to 2.1:1.

The present invention is elucidated by means of the following non-limiting examples.

EXAMPLE 1

A prepolymer was prepared by adding together, in a flask under nitrogen and with exclusion of air, 40 g of a 50 wt. % solution of tris-(β-hydroxypropyl)-isocyanurate, hereinafter referred to as THPIC, in dimethyl formamide, 40 g of poly(oxytetramethylene) glycol having a molecular weight of 662, 79 g of 4,4'-diisocyanato dicyclohexyl methane, 72 g of cellosolve acetate, and 0.03 g of dibutyltin dilaurate.

The mixture was reacted for 6 hours at 70° C. and a 60 wt. % solution of a prepolymer designated as 1, with an NCO content of 4.5%, was obtained. This prepolymer was used in four different clear lacquers by mixing the components listed below:

Lacquer 1-1—30 g of the prepolymer solution and 0.03 g of triethylene diamine (20 wt. % solution in dimethylaminoethanol).

Lacquer 1-2—33 g of the prepolymer solution, 7.3 g of 50 wt. % solution of THPIC in dimethyl formamide, and 0.045 g of dibutyltin dilaurate.

Lacquer 1-3—33 g of the prepolymer solution, 1.5 g of butanediol, and 0.045 g of dibutyltin dilaurate.

Lacquer 1-4—33 g of the prepolymer solution, 0.9 g of butanediol, 29 g of 50% THPIC solution, and 0.045 g of dibutyltin dilaurate.

EXAMPLE 2

In the same manner as described in Example 1, a number of prepolymers identified as A through D, were prepared in the form of 60 wt. % solutions, as well as one reference prepolymer solution F not according to the present invention. The reactants used are listed in Table 1, the quantities used herein being expressed in grams.

TABLE 1

|  | A | B | C | D | F |
|---|---|---|---|---|---|
| THPIC (50% solution) | 40 | 40 | 40 | 40 | — |
| 4,4' diisocyanate dicyclohexyl methane | 79 | 79 | 79 | 57.6 | 79 |
| cellosolve acetate | 72 | 78 | 76 | 62.4 | 45 |
| toluene | — | — | — | — | 45 |
| dibutyl tin dilaurate | — | — | 0.015 | — | 0.015 |
| poly(oxytetramethylene) glycol, mol. wt. 662 | 40 | — | — | — | 40 |
| polycaprolactone diol, mol. wt. 813 | — | 49 | — | — | — |
| poly(oxypropylene)glycol, mol. wt. 768.4 | — | — | 46 | — | — |
| hydroxyl-containing polybutadiene, mol. wt. 2800, equivalent wt. 1204 | — | — | — | 46 | — |
| trimethylolpropane-propylene oxide adduct, mol. wt. 303 | — | — | — | — | 18 |

Prepolymers A-D so prepared were combined with clear lacquers by mixing a quantity of prepolymer solution with 2.9 g of 50% THPIC solution, 0.9 g of butanediol, 3 g of toluene, and 0.045 g of dibutyltin dilaurate. In lacquer F 1.4 g of the trimethylolpropane-propylene oxide adduct was used instead of the THPIC solution.

The quantities of prepolymer used were:

| Lacquer | 2-A | 26.9 g |
|---|---|---|
|  | 2-B | 28.6 g |
|  | 2-C | 29.1 g |
|  | 2-D | 32.7 g |
|  | 2-F | 26.5 g |

EXAMPLE 3

In the same manner as described in Example 1, a prepolymer, in the form of a 60 wt. % solution, was prepared from 66 g of THPIC (50% solution), 78.6 g of 4,4-diisocyanate dicyclohexyl methane, 20.7 g of cellosolve acetate, and 20.7 g of toluene.

This prepolymer was used to prepare two clear lacquers identified as 3-1 and 3-2, by mixing together 24.8 g of the prepolymer solution with 5.0 g of cellosolve acetate, 5.0 g of toluene, 0.03 g of dibutyl tin dilaurate. To lacquer 3-1, 4.0 g of poly(oxytetramethylene)glycol molecular weight 662 and 1.3 g of butane diol were added while in lacquer 3-2, 5.3 g of poly(oxytetramethylene)glycol-molecular weight-662 and 1.1 g of butane diol were added.

EXAMPLE 4

The lacquers obtained in Examples 1-3 were applied to phosphated steel and to glass as a 0.127 mm thick coat. The coats were hardened for 12 hours at 25° C. and then for 2 hours at 100° C., after which they were conditioned at room temperature for at least 48 hours. The coats were examined and evaluated in the following manner. The Sward hardness was determined by the method described in Gardner and Sward's "Paint Testing Manual," 13th ed., Ch. 5, ASTM, page 472. The impact resistance was determined in accordance with ASTM Standard D-2794-69, by means of a Gardner-Impact apparatus (bar weighing 1.8 kg, cross-section of punch 1.25 cm. cross-section of die 1.43 cm).

The water resistance is defined as the time for which the lacquered glass plate has to be immersed in water at room temperature before the lacquer film can be peeled off. The film of lacquer removed from the glass plate was dried in air for at least 24 hours and then used for determining the tensile strength. This test was carried out with an Instron bench-type tensile tester, using a rate of pull of 12.7 cm/minute.

The results of the tests are compiled in Table 2.

TABLE 2

| lacquer | Sward hardness | Gardner impact direct | resistance (m/kgf) indirect | tensile strength N/mm$^2$ | elongation % | water resistance hours |
|---|---|---|---|---|---|---|
| 1-1 | 45 | 7.3 | 2.8 | 37.9 | 6.3 | 1 |
| 1-2 | 49 | 3.4 | >0.5 | — | — | 1 |
| 1-3 | 35 | >9.0 | >9.0 | 48.4 | 11.5 | 2 |
| 1-4 | 45 | 8.4 | 8.4 | 45.4 | 8.7 | 1 |
| 2-A | 60 | >9.0 | >9.0 | 51.1 | 9.5 | 1 |
| 2-B | 52 | 9.0 | 5.6 | 52.3 | 12.5 | 1 |
| 2-C | 46 | 6.7 | >1.1 | 45.6 | 8.3 | 1 |
| 2-D | 22 | >9.0 | >9.0 | 26.2 | 7.3 | 2 |
| 2-F* | 40 | >9.0 | 9.0 | 36.7 | 17.7 | 1 |
| 3-1 | 56 | 6.7 | 1.1 | 57.9 | 8.3 | 5 |
| 3-2 | 55 | >9.0 | >9.0 | 53.3 | 8.3 | 1 |

*not prepared in accordance with the invention

EXAMPLE 5

Two-component polyurethane coatings were prepared in which ethoxylated tris-(β-hydroxypropyl)isocyanurate, hereinafter referred to as "THEPIC," was used. This compound was prepared by reacting 3.1 moles of ethylene oxide with one mole of THPIC. It had a molecular weight of 467.4 and an equivalent weight of 155.8.

An isocyanate-terminated prepolymer was prepared by reacting 1 mole of THEPIC with 3 moles of 4,4'-dicyclohexyl methane diisocyanate, dissolved in 537 g of toluene, with 0.02 wt. % of dibutyltin dilaurate as catalyst. The prepolymer had an equivalent weight of 596.8 g per isocyanate group. The prepolymer was cured with a polymeric polyol at an NCO/OH ratio of 1.05.

In lacquer 5-A, the polymeric polyol was an hydroxyl-terminated polyester with an equivalent weight of 260 (Desmophen 1100, obtained from Mobay Corp., USA). The solids content of the mixture was 60 wt. % and the pot life was 7 hours.

In lacquer 5-B, the polymeric polyol was an hydroxyl group containing polyacrylate with an equivalent weight of 1000 as a 60 wt. % solution (acryloid Au-680 obtained from Rohm & Haas). The solids content of the mixture was 50 wt. % and the pot life was 12 hours.

Both lacquers 5-A and 5-B were coated on glass and on steel panels as described in Example 4 and the physical properties were tested. The results are presented in Table 3.

EXAMPLE 6

Two-component coatings were prepared using THEPIC as described in the preceding examples. In this experiment, the polyisocyanate component was mixed with a mixture of THEPIC and a polymeric polyol, at an overall NCO/OH ratio of 1.05. The polyisocyanate was the reaction product of 3 moles of hexamethylene diisocyanate with one mole of water, present and available as a 75 wt. % solution in a 1:1 mixture of xylene and cellosolve acetate (Desmodur N-75 of Mobay Corp.). The solution has an equivalent weight of 255.

In lacquer 6-A, 267.7 g of the polyisocyanate were mixed with 77.9 g of THEPIC and 500 g of the hydroxyl group containing polyacrylate (Acryloid Au-680) and 0.05 wt. % of dibutyltin dilaurate with 1.0 wt. % of a 10% solution of cellulose acetate butyrate in cellosolve acetate were added. The pot life of the composition was 1.75 hours.

In lacquer 6-B, 267.7 g of the polyisocyanate were mixed with 116.8 g of THEPIC and 250 g of the polyacrylate (Acryloid Au-680) and the same amount of catalyst and cellulose acetate butyrate were added as above. The pot life was 1.5 hours.

Both lacquers were coated glass and steel panels as described in Example 4. The properties are presented in Table 3.

EXAMPLE 7

One-component urethane coatings were prepared based on a mixture of THEPIC and toluene diisocyanate (80% 2,4 and 20% 2,6). First a prepolymer was prepared by reacting one mole of THEPIC with three moles of toluene diisocyanate in toluene, after which two moles of the adduct were extended with two moles of poly(oxypropylene)glycol in cellulosive acetate. As the catalyst 0.3 wt. % of triethylenediamine were added.

Lacquer 7A was prepared using polyoxypropylene glycol with an equivalent weight of 384.2 (Pluracol P-710 from BASF Wyandotte). The resulting prepolymer had an equivalent weight of 686.8 per isocyanate group, an NCO-content as a 60 wt. % solution of 3.67% and a pot life of 4 hours.

Lacquer 7-B was prepared using poly(oxypropylene)-glycol with an equivalent weight of 216.6 (Pluracol P-410 of BASF Wyandotte). The resulting prepolymer had an equivalent weight of 603.0. The 60 wt. % solution had a NCO-content of 4.18% and a pot life of 7 hours.

Both lacquers were coated on glass and steel panels. The physical properties are presented in Table 3.

In the following table the testing procedure and observations were as in Example 4 unless otherwise indicated.

TABLE 3

| Lacquer | 5-2 | 5-B | 6-A | 6-B | 7-A | 7-B |
|---|---|---|---|---|---|---|
| Sward hardner | 36 | 24 | 16 | 20 | 22 | 44 |
| Gardner impact resistance m/kgf | | | | | | |
| direct | 9.0 | 7.8 | n.d. | n.d. | >9.0 | >9.0 |
| indirect | 5.0 | 1.7 | n.d. | n.d. | >9.0 | 5.0 |
| tensile strength N/mm² | 50.0 | 20.9 | 20.5 | 23.7 | 39.0 | 54.5 |
| elongation % | 50 | 75 | 115 | 90 | 52 | 45 |
| abrasion*, g | 0.0132 | 0.0820 | 0.0192 | 0.0185 | n.d. | n.d. |

*determined according to ASTM D-1044 with the CS-17 wheel, 1000 g load, and expressed as the loss of weight after 1000 cycles.
Lacquers 6A and 6B were tested for corrosion resistance by putting coated mild steel panels in a spray chamber (5% NaCl solution at 27° C.). After two weeks the cross-hatched panels showed no visible creep or rust.

Concerning the preparation of ethoxylated tris-(β-hydroxypropyl) isocyanurate, we refer to our copending application SN Frisch et al, filed on Jan. 18, 1979, the disclosure of which is hereby incorporated by reference.

What is claimed is:

1. In a process for producing a lacquer binder by reacting a polyisocyanate with at least one polyol and at least one trifunctional hydroxyl compound, the improvement comprising forming a reaction product from:
    A-1—a polymeric polyhydroxy compound containing at least 2 hydroxyl groups and having a molecular weight of between about 300 and about 5000;
    A-2—a diol having a moleculr weight of between about 60 and about 200, said diol present in an amount such that for every hydroxyl group derived from the polymeric polyol (A-1), there are present between 0 and 20 hydroxyl groups derived from the lower molecular weight diol A-2;
    B—tris-(β-hydroxypropyl)-isocyanurate, or ethoxylated tris-(β-hydroxypropyl)-isocyanurate present in an amount such that there are between 0.25 and 2.5 hydroxyl groups derived from the sum of the A-1 and A-2 polyols for every hydroxyl group derived from the tris-(β-hydroxypropyl)-isocyanurate or the ethoxylated tris(β-hydroxypropyl) isocyanurate; and
    C—at least one polyisocyanate containing at least 2 isocyanate groups per molecule, present in an amount such that there are between about 0.99 and about 1.10 NCO groups for every hydroxyl group.

2. The process according to claim 1 wherein the reaction mixture also contains a catalyst accelerator for the isocyanate reaction.

3. The process according to claim 1 wherein the polymeric polyhydroxy compound is a polyol selected from the group consisting of a polyoxyalkylene glycol derived from at least one C₂ to C₄ aliphatic diol, a hydroxyl-terminated polylactone, a hydroxyl-terminated polyester, a butadiene polymer containing hydroxyl groups, a copolymer of butadiene with acrylonitrile, isoprene or styrene containing hydroxyl groups, and a polyacrylate containing hydroxyl groups.

4. The process according to claims 1 or 3 wherein the polymeric polyhydroxy compound (A-1) has a molecular weight of between about 500 and about 2000.

5. The process according to claims 1 or 3 wherein in addition to the polymeric polyhydroxy compound, an aliphatic diol having from 2 to 6 carbon atoms is included in an amount such that for every hydroxyl group derived from the polymeric polyol (A-1) there are from about 0.5 to about 5.0 hydroxyl groups derived from the added aliphatic diol.

6. The process according to claim 1 wherein a prepolymer is prepared by reacting the isocyanate, the polymeric polyol and at least part of the tris-(β-hydroxypropyl)-isocyanurate or its ethoxylated derivative a proportion of at least 2 isocyanate groups for every hydroxyl group, and thereafter the prepolymer is crosslinked by mixing with a further amount of the isocyanurate triol such that there are from 1.0 to 1.1 free NCO groups for every hydroxyl group.

7. The process according to claim 6 wherein the prepolymer is crosslinked by the addition of an aliphatic diol having from 2 to 6 carbon atoms in an amount such that for every hydroxyl group derived from the polymeric polyol (A-1) there are from about 0.5 to about 5.0 hydroxyl groups derived from the aliphatic diol.

8. The process according to claim 6 wherein the prepolymer contains from 0.1 to 1.5 hydroxyl groups derived from the polymeric polyol for every hydroxyl group derived from the isocyanurate triol.

9. Process according to claim 1 wherein a prepolymer is prepared by reacting the polyisocyanate with the isocyanurate triol at an NCO to OH ratio of between 2.0:1 and 2.1:1, and the polymeric polyol (A-1) and the low-molecular-weight diol (A-2) are added to the prepolymeric to effect crosslinking.

10. The process according to claims 1, 6 or 9 wherein the polyisocyanate used is an aliphatic diisocyanate.

11. The process according to claims 1, 6 or 9 wherein the polymeric polyol has between 2 and 3 hydroxyl groups per molecule.

12. A lacquer binder prepared by the process of claim 1.

13. In a process for producing a lacquer binder by reacting a polyisocyanate with at least one polyol and at least one trifunctional hydroxyl compound, the improvement comprising forming a prepolymer from:
    A-1—a polymeric polyhydroxy compound containing at least 2 hydroxyl groups and having a molecular weight of between about 500 and about 5000;
    A-2—a diol having a molecular weight of between about 60 and about 200, said diol present in an amount such that for every hydroxyl group derived from the polymeric polyol (A-1), there are present between 0 and 20 hydroxyl groups derived from the lower molecular weight diol A-2;
    B—tris-(β-hydroxypropyl)-isocyanurate, or ethoxylated tris-(β-hydroxypropyl)-isocyanurate present in an amount such that there are between 0.25 and 2.5 hydroxyl groups derived from the sum of the A-1 and A-2 polyols for every hydroxyl group derived from the tris-(β-hydroxypropyl)-isocyanurate or the ethoxylated tris(β-hydroxypropyl) isocyanurate; and
    C—at least one polyisocyanate containing at least 2 isocyanate groups per molecule, present in an amount such that there are between about 0.99 and about 1.10 NCO groups for every hydroxyl group wherein the isocyanate, the polymeric polyol and at least part of the tris-(β-hydroxypropyl)-isocyanurate or its ethoxylated derivative in a proportion of at least 1 isocyanate groups for every hydroxyl group, and thereafter crosslinking the thus formed prepolymer with a further amount of the isocyanurate triol such that there are from 1.0 to 1.1 free NCO groups for every hydroxyl group.

* * * * *